(12) United States Patent
Johnson et al.

(10) Patent No.: US 6,270,030 B1
(45) Date of Patent: Aug. 7, 2001

(54) SYSTEM FOR CONTROLLING COMPATIBILITY OF TAPE CARTRIDGES HAVING THE SAME FORM FACTOR

(75) Inventors: Michael W. Johnson, Cottage Grove; Douglas W. Johnson, Stillwater; Charles L. Dennis, II, Lake Elmo, all of MN (US)

(73) Assignees: Imation Corp., Oakdale, MN (US); Benchmark Storage Innovations Inc., Boulder, CO (US)

( * ) Notice: Subject to any disclaimer, the term of this patent is extended or adjusted under 35 U.S.C. 154(b) by 0 days.

(21) Appl. No.: 09/407,817

(22) Filed: Sep. 28, 1999

(51) Int. Cl.[7] .............................. G03B 23/02; G11B 23/02
(52) U.S. Cl. ...................... 242/338; 242/347; 242/352.3; 360/132
(58) Field of Search ..................................... 242/336, 338, 242/338.2, 338.4, 337, 337.1, 347, 352.3, 356.5, 356.6; 360/96.1, 96.5, 96.6, 132

(56) References Cited

U.S. PATENT DOCUMENTS

| 3,907,230 | | 9/1975 | Merle et al. . | |
|---|---|---|---|---|
| 4,159,811 | | 7/1979 | Grant . | |
| 4,333,618 | | 6/1982 | Seaman . | |
| 5,204,792 | | 4/1993 | Bryer . | |
| 5,448,438 | | 9/1995 | Kasetty . | |
| 5,480,103 | | 1/1996 | Gerfast et al. . | |
| 5,497,955 | * | 3/1996 | Angellotti et al. ................. | 242/338.4 |
| 5,558,291 | | 9/1996 | Anderson et al. . | |
| 5,730,379 | * | 3/1998 | Miyamoto ............................. | 242/338 |
| 5,769,347 | * | 6/1998 | Kikuchi et al. ....................... | 242/347 |
| 5,779,172 | * | 7/1998 | Anderson et al. .................... | 242/336 |
| 5,790,337 | | 8/1998 | Steinberg et al. . | |
| 5,868,333 | * | 2/1999 | Nayak .................................. | 242/338 |
| 5,890,669 | * | 4/1999 | Buckland et al. ................... | 242/336 |
| 6,095,445 | * | 8/2000 | Hentrich ......................... | 242/338 X |
| 6,095,446 | * | 8/2000 | Buckland et al. ................... | 242/336 |

FOREIGN PATENT DOCUMENTS 0 562 390 A2   9/1993 (EP) .

* cited by examiner

*Primary Examiner*—William A. Rivera
(74) *Attorney, Agent, or Firm*—Eric D. Levinson

(57) ABSTRACT

A tape cartridge and cartridge drive system for controlling the compatibility of first and second tape cartridges having the same form factor in first and second tape drives. The system permits backward compatibility of the first tape cartridge in the second tape drive, while prohibiting the second tape cartridge from being used in the first tape drive. The second tape cartridge includes a tab projecting distally from a recess. The tab is positioned to contact the door actuator surface on the first tape drive so as to prevent insertion of the second tape cartridge into the first tape drive. The tab defines a cross-sectional area perpendicular to the insertion direction smaller than a gap in the door actuator assembly of the second tape drive to permit the second tape cartridge to be inserted into the second tape drive, whereby the second tape cartridge is compatible only with the second tape drive.

11 Claims, 6 Drawing Sheets

SYSTEM FOR CONTROLLING COMPATIBILITY OF TAPE CARTRIDGES HAVING THE SAME FORM FACTOR

FIELD OF THE INVENTION

The present invention is directed to a system for mechanically distinguishing between two tape cartridges of the same form factor that contain magnetic tape having different recording characteristics.

BACKGROUND OF THE INVENTION

Tape cartridges configured to meet certain minimum physical requirements are said to have a particular "form factor." In the tape cartridge arts, form factor generally defines the peripheral dimensions of the cartridge and the interface characteristics with the tape drive. For a variety of economic and manufacturing reasons, it may be desirable to provide a tape cartridge for a different type of tape drive that has the same form factor as existing tape cartridges. If there are different recording and dimensional characteristics of the magnetic tape for the different tape drive, however, such a tape cartridge must be distinguishable from existing tape cartridges of the same form factor.

Current techniques for distinguishing between different tape cartridges having the same form factor typically rely either on the read/write head assembly to magnetically detect a non-conforming tape format, or on some type of interaction between a physical feature of the tape cartridge and a sensing circuit in the tape drive. European Patent Application 0 389 121, for example, describes a data protection feature for a tape cartridge that enables sensing circuitry within the tape drive to distinguish between two different types of tape cartridges in otherwise identical form factors.

U.S. Pat. No. 5,480,103 (Gerfast et al.) discloses mutually incompatible mechanical cartridge lockout mechanisms incorporated into tape cartridges of the same form factor to mechanically distinguish between tape cartridges containing magnetic tape with different recording characteristics. In operation, the first tape cartridge can not be inserted into the tape drive for reading the second tape cartridge. Conversely, the second tape cartridge can not be inserted into a tape drive for reading the first tape cartridge.

Digital linear tape drives of the type sold under the "DLTtape" trademark are the most popular backup drives on the market today. As the drive and cartridge technology evolves to incorporate magnetic tapes with different recording characteristics, it is desirable for the new drives to be backwardly compatible with the enormous number of existing digital linear tape cartridges in use. In some circumstances, however, a fail-safe mechanical incompatibility is necessary to prevent new tape cartridges with magnetic tape having different recording characteristics for the new tape drive from being inadvertently used in an older style tape drive that might destroy data written on the tape by a newer drive.

BRIEF SUMMARY OF THE INVENTION

The present invention is directed to a system for controlling the compatibility of first and second tape cartridges having the same form factor in first and second tape drives. The present system permits backward compatibility of the first tape cartridge in the second tape drive, while prohibiting the second tape cartridge from being used in the first tape drive.

In one embodiment, the first and second tape cartridges each include a housing with an access door extending across a portion of a front face, and a recess along a portion of a side face and a door latch positioned adjacent to the recess and a pivot axis of the door. The first and second tape drives each have a door actuator assembly positioned in a cartridge interface. Each of the door actuator assemblies includes a ramp to unlock the door latch on the first and second tape cartridges and a door actuator surface to open the doors on the first and second tape cartridges as tape cartridges are inserted along an insertion direction, such that the first tape cartridge is compatible with the first and second tape drives. The door actuator assembly on the second tape drive has a gap extending along the insertion direction between the ramp and the door actuator surface. The second tape cartridge comprises a tab projecting distally from the recess. The tab is positioned to contact the door actuator surface on the first tape drive so as to prevent insertion of the second tape cartridge into the first tape drive. The tab defines a cross-sectional area perpendicular to the insertion direction smaller than the gap to permit the second tape cartridge to be inserted into the second tape drive, whereby the second tape cartridge is compatible only with the second tape drive.

In one embodiment, the first and second tape cartridges contain magnetic tape with different recording characteristics. The second tape drive typically distinguishes the first tape cartridge from the second tape cartridge by recording characteristics on magnetic tape contained therein. The tab can be integrally molded into the housing of the second tape cartridge.

The present invention is also direct to a housing for a second tape cartridge having the same form factor as a housing for a first tape cartridge. The first and second housings each include an access door extending across a portion of a front face and a recess along a portion of a side face. A door latch is positioned adjacent to the recess and a pivot axis of the door. The housing for the second tape cartridge comprises a tab projecting distally from the recess. The tab is positioned to contact a door actuator assembly on a first tape drive so as to prevent insertion of the second tape cartridge into the first tape drive along an insertion direction. The tab defines a cross-sectional area perpendicular to the insertion direction smaller than a gap in a door actuator assembly of the second tape drive to permit the second tape cartridge to be inserted into the second tape drive, whereby the first tape cartridge is compatible with the first and second tape drives and the second tape cartridge is compatible only with the second tape drive.

In another embodiment, the system for controlling the compatibility of first and second tape cartridges having the same form factor in first and second tape drives includes a first tape drive having a drive clutch with a first diameter and the second tape drive having a drive clutch with a second diameter smaller than the first diameter. The first and second tape cartridges each include a housing containing a hub with magnetic tape. The housing of the first tape cartridge has an opening larger than the first diameter to permit mechanical coupling of the hub in the first tape cartridge with the drive clutch in the first and second tape drives. The housing of the second tape cartridge comprises an opening larger than the second diameter and smaller than the first diameter to permit mechanical coupling of the hub in the second tape cartridge with the drive clutch in the second tape drive, but not the first tape drive, whereby the second tape cartridge is compatible only with the second tape drive.

In another embodiment, the system for controlling the compatibility of first and second tape cartridges having the same form factor in first and second tape drives includes the first tape drive having a drive clutch with a plurality of teeth and the second tape drive having a drive clutch with a plurality of teeth and at least one flat region at or below a plane defined by valleys of the teeth. The first tape cartridge includes a housing containing a hub with magnetic tape. The hub of the first tape cartridge has a plurality of teeth capable of meshing with the teeth on the drive clutch of the first and second tape drives. The second tape cartridge includes a housing containing a hub with magnetic tape. The hub of the second tape cartridge has a plurality of teeth and at least one flat region located above a plane defined by valleys of the teeth and corresponding to the flat region on the drive clutch of the second tape drive, whereby the second tape cartridge is compatible only with the second tape drive.

DETAILED DESCRIPTION OF THE INVENTION

Figure 1:
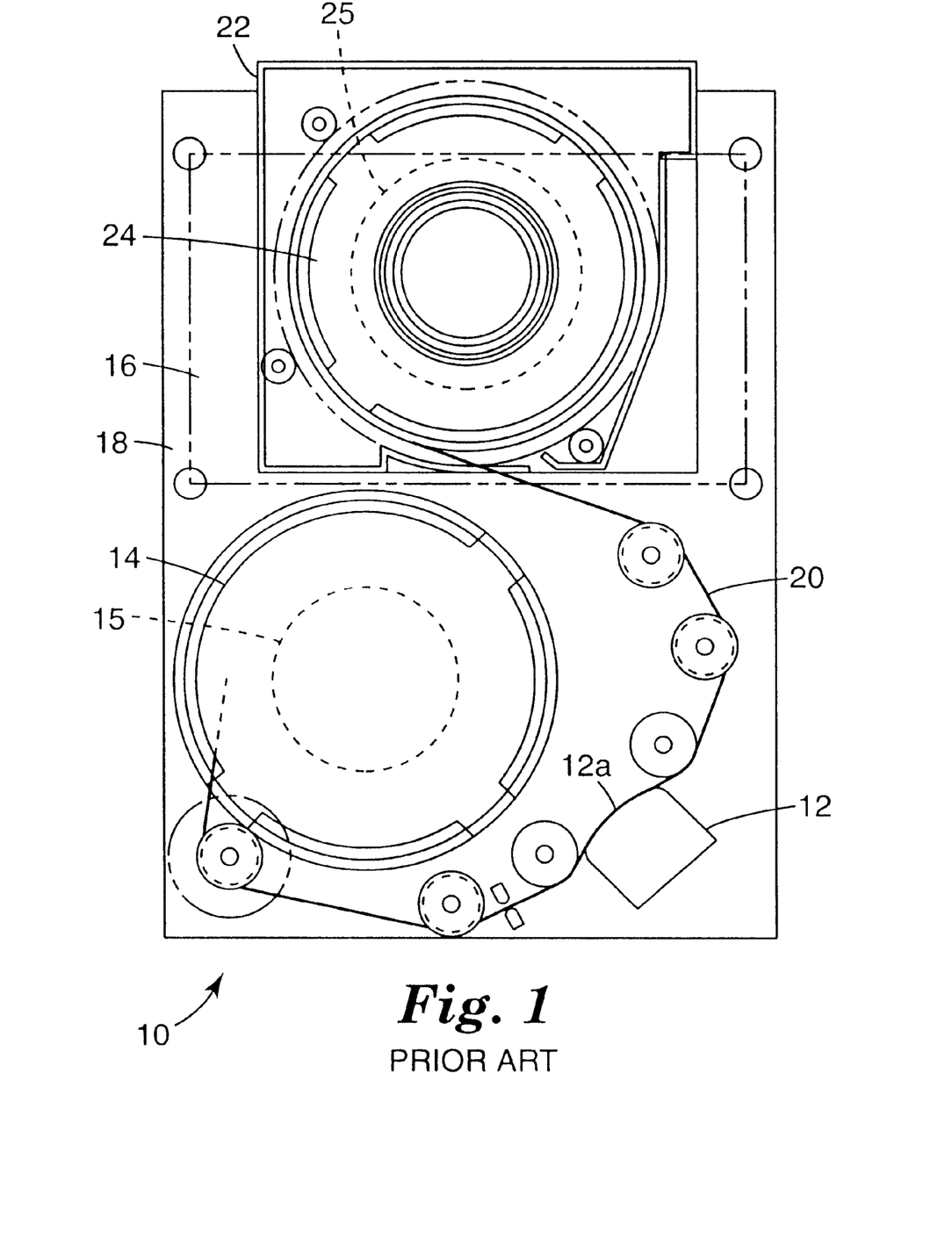
FIG. 1 is a schematic illustration of a prior art tape drive assembly.

FIG. 1 illustrates a prior art tape drive assembly 10 such as disclosed in U.S. Pat. No. 5,790,337, entitled "Tape Cartridge Qualified by Location, and Identified by Geometry, of Type Aperture". The assembly 10 includes a tape head 12, an internal take-up reel 14 driven by a take-up reel drive motor 15, and a tape cartridge receiver 16. These elements are contained within a housing 18. Magnetic recording tape 20 of a predetermined type is provided to tape drive assembly 10 by insertion of a cartridge 22 into the tape cartridge receiver 16. The tape cartridge receiver 16 includes a supply reel drive motor 25 that engages and drives supply reel 24 when the cartridge 22 is loaded into the cartridge receiver 16. After being engaged by a buckling mechanism, such as for example as described U.S. Pat. No. 4,720,913 entitled "Mechanism for Joining Tape Leaders", the tape 20 is spooled-off of a cartridge supply reel 24, with an outermost tape leader being wound onto the internal take-up reel 14.

Figure 2:
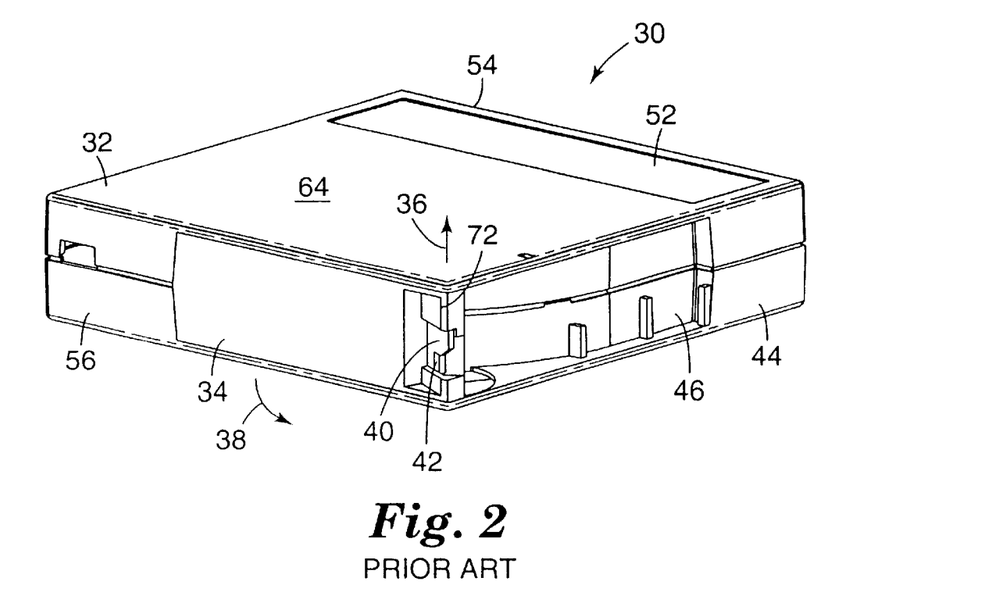
FIG. 2 is perspective view of a prior art tape cartridge.
Figure 3:
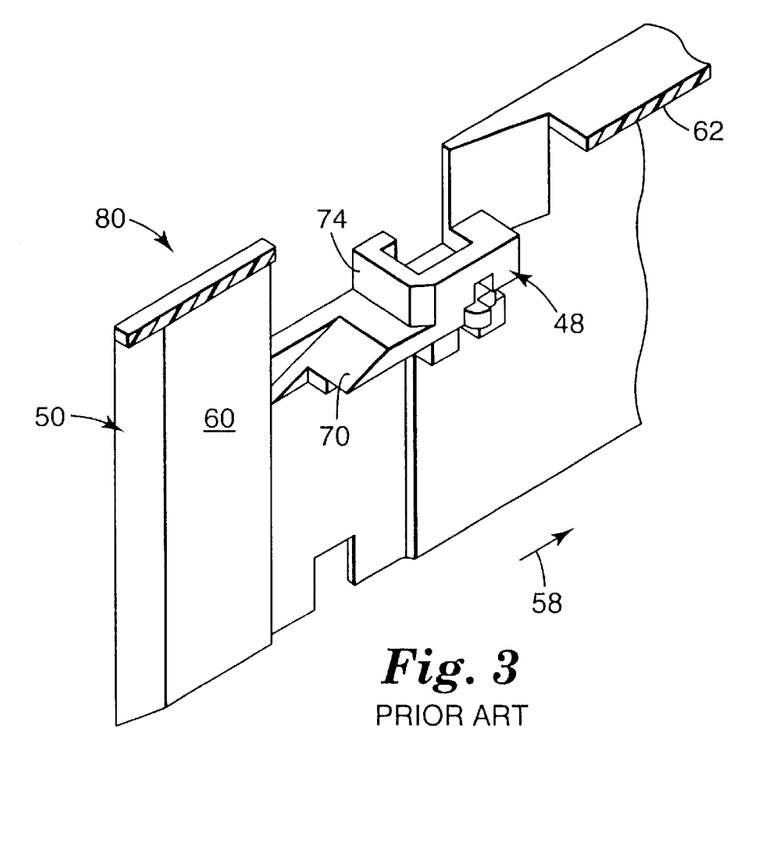
FIG. 3 is a perspective view of a prior art tape cartridge interface.

FIGS. 2 and 3 are perspective views of a prior art first tape cartridge 30 and a corresponding first tape cartridge interface 50 for a first tape drive 80, such as the tape drive assembly 10 of FIG. 1. Housing 32 includes a door 34 that rotates about an axis 36 in the direction 38 when the first tape cartridge 30 is inserted into the tape cartridge interface 50. The door 34 includes a door latch 40 having a cut out 42. Side surface 44 of the cartridge 30 includes a recess 46 that cooperatively engages with first door actuator assembly 48 on a first tape cartridge interface 50 (see FIG. 3).

In operation, a user grasps a gripping surface 52 near rear face 54 of the first tape cartridge 30. The front face 56 of the first tape cartridge 30 is inserted into the first tape cartridge interface 50 of the first tape drive 80 along an insertion direction 58. Side guide surface 60 and top guide surface 62 engage with the side surface 44 and top surface 64 of the first tape cartridge 30, respectively. As the first tape cartridge 30 progresses along the insertion direction 58, ramp 70 penetrates cutout 42. Further insertion causes the ramp 70 to lift the door latch 40. Surface 72 on the door 34 engages with the door actuator surface 74 of the first tape cartridge interface 50 to rotate the door 34 in the direction 38, thereby exposing the magnetic recording tape 20 (see FIG. 1).

Figure 4:
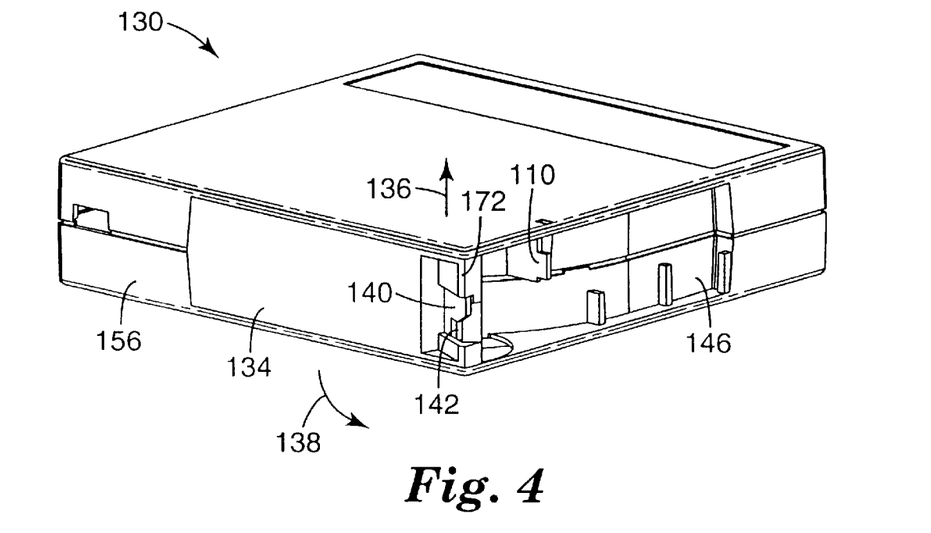
FIG. 4 is a perspective view of a tape cartridge in accordance with the present invention.
Figure 5:
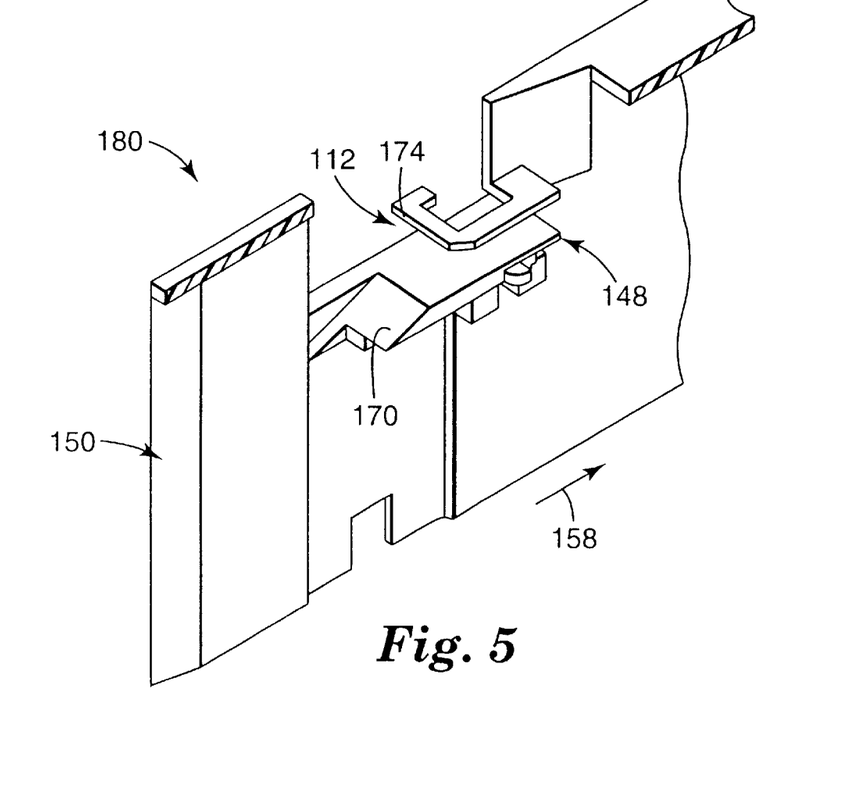
FIG. 5 is a perspective view of a cartridge interface in accordance with the present invention.

FIGS. 4 and 5 are perspective views of a second tape cartridge 130 and a corresponding second tape cartridge interface 150 for a second tape drive 180 in accordance with the present invention. Door latch 140 includes a cut out 142. Door 134 on the front face 156 of the second tape cartridge 130 rotates about an axis 136 in a direction 138 to expose the magnetic tape (see FIG. 1). The first tape cartridge 30 has substantially the same form factor as the second tape cartridge 130, except that recess 146 includes a tab or stop 110. The tab 110 may be integrally formed with the recess 146 or attached with an adhesive. The second tape cartridge interface 150 of the second tape drive 180 includes a door actuator assembly 148 having a ramp 170 and a door actuator surface 174. Gap 112 is formed between the ramp 170 and the door actuator surface 174.

Figure 7A:
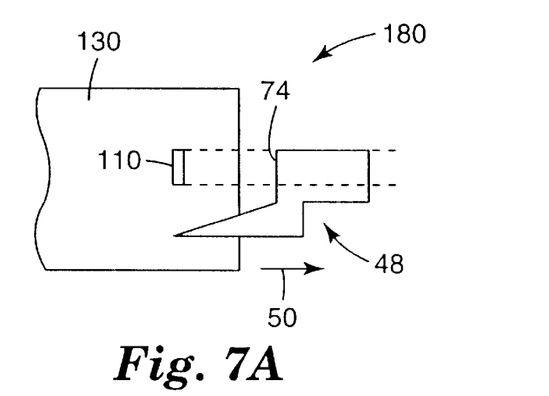
FIG. 7A is a schematic illustrations of the door actuator assembly illustrated in FIG. 3.

FIG. 7A is a schematic illustration of the door actuator assembly 48 in the first tape drive 80 shown in FIG. 3. Tape cartridge 130 is illustrated schematically with only the tab 110 shown in detail. As the second tape cartridge 130 slides along the tape cartridge interface 50, the tab 110 engages the door actuator surface 74 to block complete insertion into the first tape drive 80. Therefore, the second tape cartridge 130 can not be used with the first tape drive 80.

Figure 7B:
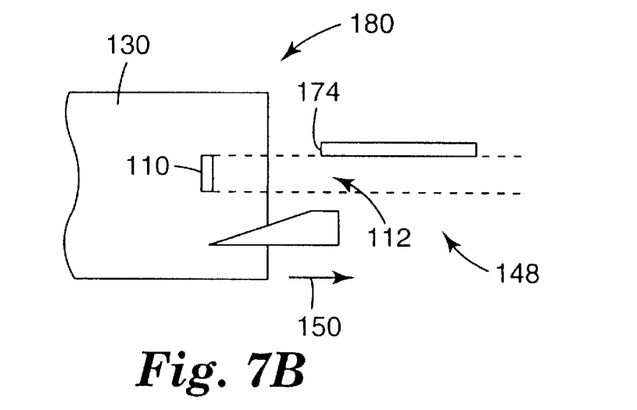
FIG. 7B is a schematic illustrations of the door actuator assembly illustrated in FIG. 5.

FIG. 7B is a schematic illustration of the door actuator assembly 148 in the second tape drive 180 shown in FIG. 5. As the second tape cartridge 130 slides along the tape cartridge interface 150, the tab 110 slides through the gap 112 so that the second tape cartridge 130 can be completely inserted into the second tape drive 180. The door actuator surface 174 engages with the surface 172 on the second tape cartridge 130 to open the door 134 (see FIG. 4). In this way, second tape cartridges 130 having magnetic tape with different recording characteristics can only be used in the second tape drive 180 shown in FIG. 5. On the other hand, the door actuator surface 174 is positioned to engaged with the surface 72 on the first tape cartridge 30 so that both of the tape cartridges 30, 130 can be used with the door actuator assembly 148 provided in the second tape drive 180.

Figure 6:
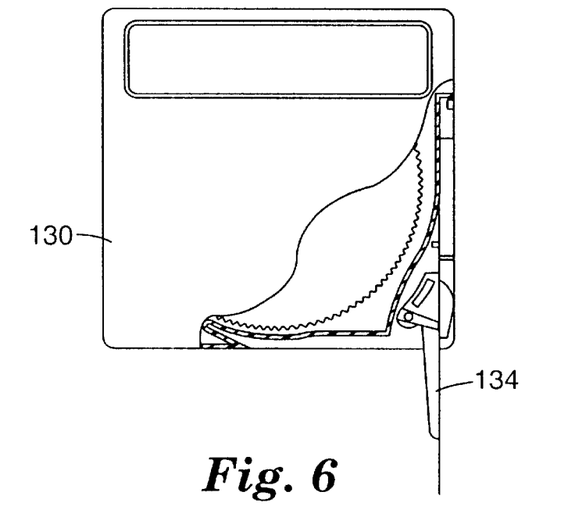
FIG. 6 is a top plan view of the tape cartridge of FIG. 4 after engagement with the tape cartridge interface.

In operation, front face 156 of the second tape cartridge 130 is inserted into the second tape drive 180 at the cartridge interface 150 along the insertion direction 158, so the ramp 170 engages with the cutout 142 and lifts the door latch 140. The door actuator surface 174 engages with the surface 172 to rotate the door 134 it about the axis 136 in the direction 138 to expose the magnetic tape. The tab 110 in the recess 146 is aligned with the gap 112 and slides above the ramp 170 and below the door actuator surface 174. The tab 110 does not interfere with the insertion of the second tape cartridge 130 into the second tape drive 180 (see FIG. 7B). FIG. 6 is a top plan view of the second tape cartridge 130 with the door 134 in the open position.

Similarly, front face 56 of the first tape cartridge 30 can be inserted into the second tape drive 180 so the ramp 170 engages with the cutout 42 and lifts the door latch 40. The door actuator surface 174 engages with the surface 72 on the door 34 to rotate it about the axis 36 in the direction 38 to expose the magnetic tape. The tab 110 is not necessary for the tape cartridge 30 to operate correctly with the second tape drive 180. On the other hand, if a user attempts to insert the second tape cartridge 130 into the first tape drive 80 shown in FIG. 3, the tab 110 will contact the door actuator surface 74 on the first tape cartridge interface 50 and prevent complete insertion of the second tape cartridge 130 into the first tape drive 80 (see FIG. 7A).

Figure 8:
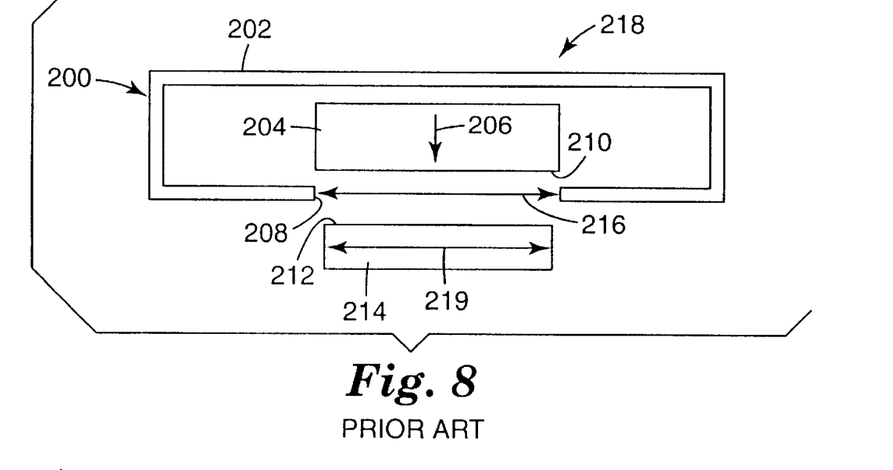
FIG. 8 is a schematic illustration of a prior art interface between the tape cartridge and a drive clutch.
Figure 9:
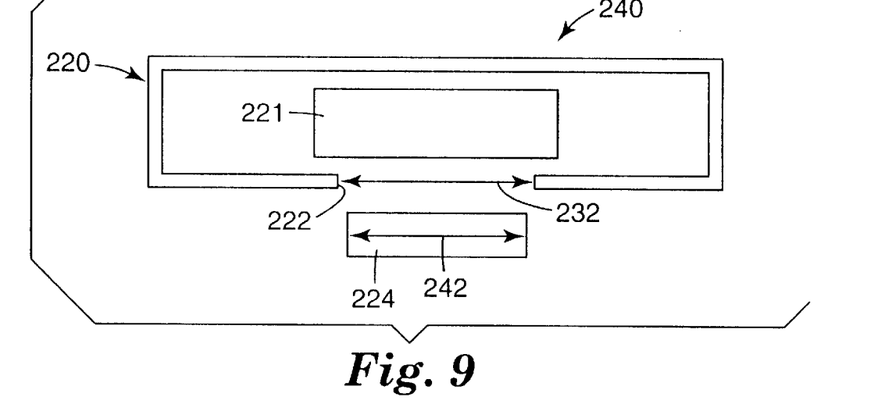
FIG. 9 is a schematic illustration of a tape cartridge interfaced with a drive clutch in accordance with the present invention.
Figure 10:
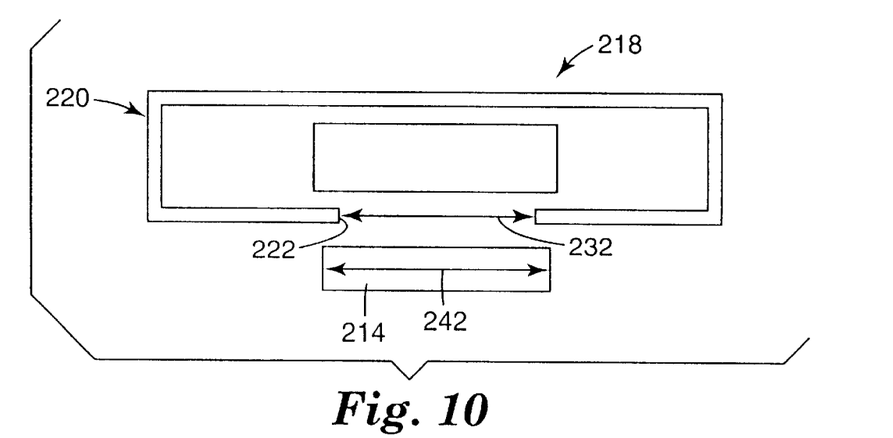
FIG. 10 is a schematic illustration of the incompatibility of the present tape cartridge with a prior drive clutch.

FIGS. 8 through 10 illustrate an alternate embodiment for achieving backward compatibility of the first tape cartridge 200 with the second tape drive, while preventing the second tape cartridge 220 from being used in the first tape drive. FIG. 8 is a schematic illustration of a first tape cartridge 200 having a cartridge housing 202 and a hub 204 containing magnetic tape (see FIG. 1). The hub 204 is biased in a direction 206 toward an opening 208 in the bottom of the cartridge housing 202. The bottom of the hub 204 includes a surface 210 configured to mechanically couple with a surface 212 on the top of a drive clutch 214. A supply reel drive motor (see FIG. 1) drives the drive clutch 214 in the first tape drive 218. The opening 208 has a first diameter 216 larger than the diameter 219 of the drive clutch 214.

FIG. 9 illustrates a second tape cartridge 220 in accordance with the present invention having an opening 222 with a diameter 232 smaller than the diameter 219 of the drive clutch 214 on the first tape cartridge 200, but larger than a diameter 242 of drive clutch 224 on second tape drive 240. The drive clutch 224 mechanically couples with the hub 221. Since the drive clutch 224 has a diameter smaller than the diameter 216 of the opening 208 of the first tape cartridge 200, the first tape cartridge 200 is backwardly compatible with the second tape drive 240.

On the other hand, as illustrated in FIG. 10, the opening 222 on the second tape cartridge 220 has a diameter 232 is smaller than the diameter 219 of the drive clutch 214 on the first tape drive 218, thereby preventing a user from inadvertently using the second tape cartridge 220 in the first tape drive 218.

Figure 11:
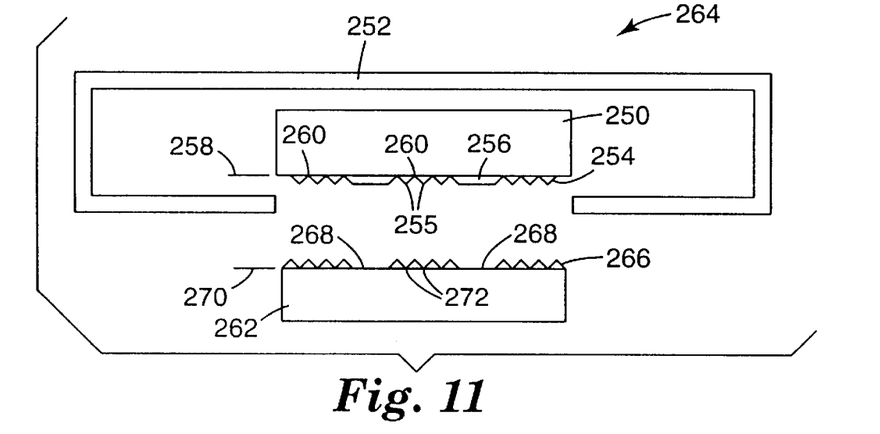
FIG. 11 illustrates a cartridge hub and drive clutch in accordance with the present invention.
Figure 12:
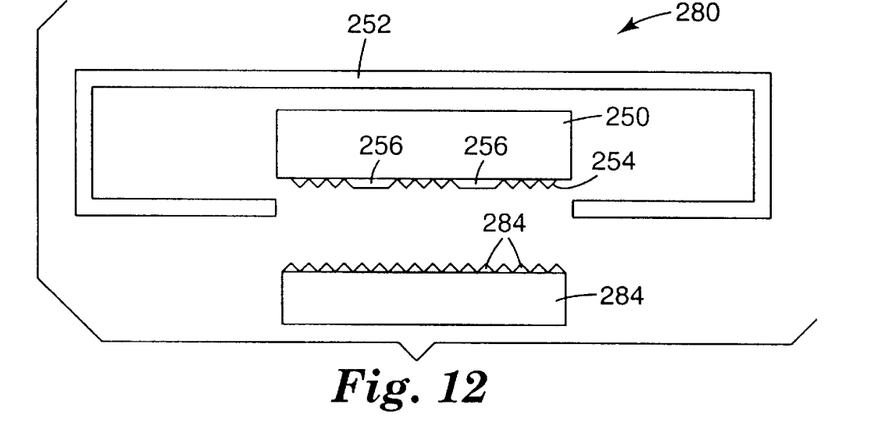
FIG. 12 illustrates the incompatibility of a cartridge hub in accordance with the present invention with prior drive clutches.
Figure 13:
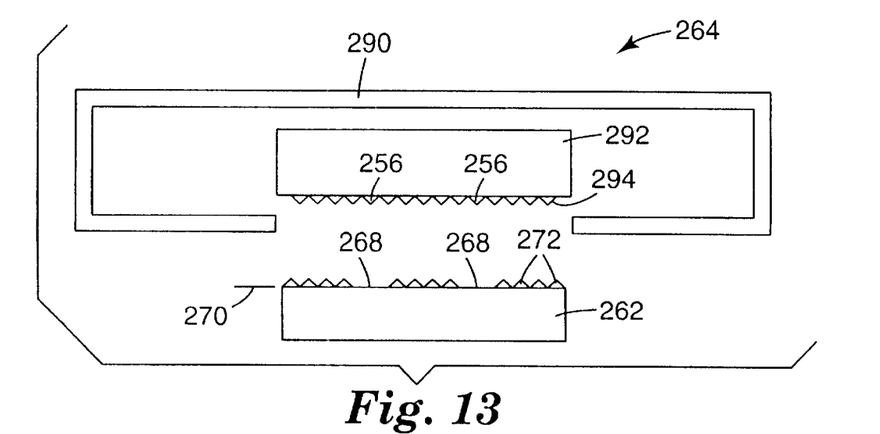
FIG. 13 illustrates the compatibility of a prior cartridge hub with a drive clutch in accordance with the present invention.

FIGS. 11 through 13 illustrate an alternate embodiment for achieving backward compatibility of first tape cartridge 290 with the second tape drive 264, while preventing the second tape cartridge 252 from being used in the first tape drive 280. FIG. 11 is a schematic illustration of the compatibility of the second tape cartridge 252 with a second tape drive 264 in accordance with the present invention. Hub 250 on second tape cartridge 252 includes a toothed regions 254 and one or more flat regions 256. The flat region 256 is located above a plane 258 defined by valleys 260 on the toothed regions 254. In the illustrated embodiment, the flat regions 256 are located in a plane defined by the peaks 255 of the tooth region 254. Drive clutch 262 in the second tape drive 264 includes a corresponding pattern of teeth 266 and one or more flat regions 268, except that the flat regions 268 are located at or below a plane 270 defined by valleys 272 on the toothed region 266. Consequently, the toothed hub 250 is compatible with the drive clutch 262. In the event of a tooth mismatch (clutch teeth 266 resting on fill regions 256 of the hub 250), the second tape drive 264 includes a motor shuffle algorithm to assure proper tooth engagement.

FIG. 12 illustrates an attempt to engage the second tape cartridge 252 of FIG. 11 with the first tape drive 280. Drive clutch 282 includes a plurality of teeth 284. The flat regions 256 on the hub 250 prevent the teeth 254 from engaging with the teeth 284 on the drive clutch 282. That is, the filled in regions 256 on the hub 250 prevent the teeth 284 from mechanically coupling with the second tape cartridge 252. Consequently, the second tape cartridge 252 can not be used with the first tape drive 280.

FIG. 13 is a schematic illustration of the compatibility of the first tape cartridge 290 with a second tape drive 264 in accordance with the present invention. Hub 292 on first tape cartridge 290 includes a toothed regions 294. Drive clutch 262 in the second tape drive 264 includes a pattern of teeth 266 and one or more flat regions 268. Since the flat regions 268 are located at or below a plane 270 defined by valleys 272 on the toothed region 266, the toothed hub 292 is compatible with the drive clutch 262. Consequently, the flat regions 268 on the drive clutch 262 do not prevent a first tape cartridge 290 from coupling with the second tape drive 264.

What is claimed is:

1. A tape cartridge and cartridge drive system including first and second tape cartridges having the same form factor in first and second tape drives, the first and second tape cartridges each including a housing with an access door extending across a portion of a front face and a recess along a portion of a side face, a door latch positioned adjacent to the recess and a pivot axis of the door, the first and second tape drives each having a door actuator assembly positioned in a cartridge interface, each of the door actuator assemblies including a ramp to unlock the door latch on the first and second tape cartridges and a door actuator surface to open the doors on the first and second tape cartridges as tape cartridges are inserted along an insertion direction, such that the first tape cartridge is compatible with the first and second tape drives, the door actuator assembly on the second tape drive having a gap extending along the insertion direction between the ramp and the door actuator surface, the second tape cartridge comprising a tab projecting distally from the recess, the tab being positioned to contact the door actuator surface on the first tape drive so as to prevent insertion of the second tape cartridge into the first tape drive, the tab defining a cross-sectional area perpendicular to the insertion direction smaller than the gap to permit the second tape cartridge to be inserted into the second tape drive, whereby the second tape cartridge is compatible only with the second tape drive.

2. The system of claim 1 wherein the first and second tape cartridges contain magnetic tape with different recording characteristics.

3. The system of claim 1 wherein the second tape drive distinguishes the first tape cartridge from the second tape cartridge by recording characteristics on magnetic tape contained therein.

4. The system of claim 1 wherein the tab is integrally molded into the housing of the second tape cartridge.

5. A housing for a second tape cartridge having the same form factor as a housing for a first tape cartridge, the first and second housings each including an access door extending across a portion of a front face and a recess along a portion of a side face, a door latch positioned adjacent to the recess and a pivot axis of the door, the housing for the second tape cartridge comprising:

a tab projecting distally from the recess, the tab being positioned to contact a door actuator assembly on a first tape drive so as to prevent insertion of the second tape cartridge into the first tape drive along an insertion direction, the tab defining a cross-sectional area perpendicular to the insertion direction smaller than a gap in a door actuator assembly of the second tape drive to permit the second tape cartridge to be inserted into the second tape drive, whereby the first tape cartridge is compatible with the first and second tape drives and the second tape cartridge is compatible only with the second tape drive.

6. The housing of claim 5 wherein the tab is integrally molded into the housing of the second tape cartridge.

7. A second tape cartridge having the same form factor as a first tape cartridge, the first and second tape cartridges each including an access door extending across a portion of a front face and a recess along a portion of a side face, a door latch positioned adjacent to the recess and a pivot axis of the door, the first tape cartridge being compatible with first and second tape drives each having a door actuator assembly positioned in a cartridge interface, each of the door actuator assemblies including a ramp to unlock the door latch on the first tape cartridge and a door actuator surface to open the door on the first tape cartridge as tape cartridges are inserted along an insertion direction, the second tape cartridge comprising:

a tab projecting distally from the recess, the tab being positioned to contact a door actuator surface on a first tape drive so as to prevent insertion of the second tape cartridge into the first tape drive, the tab defining a cross-sectional area perpendicular to the insertion direction smaller than a gap in a door actuator assembly of the second tape drive to permit the second tape cartridge to be inserted into the second tape drive, whereby the second tape cartridge is compatible only with the second tape drive.

8. The cartridge of claim 7 wherein the tab is integrally molded into the housing of the second tape cartridge.

9. A tape cartridge and cartridge drive system including first and second tape cartridges having the same form factor in first and second tape drives, the first tape drive having a drive clutch with a first diameter and the second tape drive having a drive clutch with a second diameter smaller than the first diameter, the first and second tape cartridges each including a housing containing a hub with magnetic tape, the housing of the first tape cartridge having an opening larger than the first diameter to permit mechanical coupling of the hub in the first tape cartridge with the drive clutch in the first and second tape drives, the housing of the second tape cartridge comprising an opening larger than the second diameter and smaller than the first diameter to permit mechanical coupling of the hub in the second tape cartridge with the drive clutch in the second tape drive, but not the first tape drive, whereby the second tape cartridge is compatible only with the second tape drive.

10. A housing for a second tape cartridge having the same form factor as a housing for a first tape cartridge, the first and second housings each including a hub with magnetic tape, the housing of the first tape cartridge having an opening larger than first and second diameters of drive clutches on first and second tape drives, respectively, to permit mechanical coupling with the drive clutches in the first or second tape drives, the housing of the second tape cartridge comprising an opening larger than the second diameter of the drive clutch on the second tape drive and smaller than the first diameter of the drive clutch on the first tape drive, whereby the second tape cartridge is compatible only with the second tape drive.

11. A tape cartridge and cartridge drive system including first and second tape cartridges having the same form factor in first and second tape drives, the first tape drive having a drive clutch with a plurality of teeth and the second tape drive having a drive clutch with a plurality of teeth and at least one flat region at or below a plane defined by valleys of the teeth, the first tape cartridge including a housing containing a hub with magnetic tape, the hub of the first tape cartridge having a plurality of teeth capable of meshing with the teeth on the drive clutch of the first and second tape drives, the second tape cartridge including a housing containing a hub with magnetic tape, the hub of the second tape cartridge having a plurality of teeth and at least one flat region located above a plane defined by valleys of the teeth and corresponding to the flat region on the drive clutch of the second tape drive, whereby the second tape cartridge is compatible only with the second tape drive.

\* \* \* \* \*